United States Patent [19]
Schuh

[11] Patent Number: 5,729,403
[45] Date of Patent: *Mar. 17, 1998

[54] DISK STORAGE DRIVE

[75] Inventor: Bernhard Schuh, Baindt, Germany

[73] Assignee: Papst Licensing GmbH, Spaighingen, Germany

[*] Notice: The term of this patent shall not extend beyond the expiration date of Pat. No. 4,535,373.

[21] Appl. No.: 422,846

[22] Filed: Apr. 17, 1995

Related U.S. Application Data

[62] Division of Ser. No. 106,801, Aug. 16, 1993, Pat. No. 5,424,887, which is a continuation of Ser. No. 799,363, Nov. 27, 1991, abandoned, which is a continuation of Ser. No. 764,941, Sep. 24, 1991, abandoned, which is a continuation of Ser. No. 517,623, May 1, 1990, abandoned, which is a continuation of Ser. No. 208,864, Jun. 15, 1988, Pat. No. 4,922,406, which is a continuation of Ser. No. 16,469, Feb. 17, 1987, abandoned, which is a continuation of Ser. No. 765,376, Aug. 13, 1985, abandoned, which is a continuation of Ser. No. 335,483, Dec. 29, 1981, Pat. No. 4,535,373, which is a continuation-in-part of Ser. No. 127,404, Mar. 5, 1980, abandoned.

[30] Foreign Application Priority Data

Dec. 29, 1980 [DE] Germany ............ 30 49 334.6

[51] Int. Cl.⁶ .................................................. G11B 5/012
[52] U.S. Cl. ........................ 360/97.03; 360/98.07; 360/99.08
[58] Field of Search ....................... 360/97.03, 99.08, 360/98.07

[56] References Cited

U.S. PATENT DOCUMENTS

| | | | |
|---|---|---|---|
| 3,840,761 | 10/1974 | Muller | 310/49 R |
| 3,849,800 | 11/1974 | Cuzner et al. | 360/99.08 |
| 3,873,897 | 3/1975 | Muller | 318/138 |
| 4,005,490 | 1/1977 | Duncan et al. | 360/99.08 |
| 4,054,931 | 10/1977 | Bolton et al. | 360/97.03 |
| 4,062,049 | 12/1977 | Dirks | 360/78 |
| 4,101,945 | 7/1978 | Butsch | 360/102 |
| 4,150,406 | 4/1979 | Stollorz | 360/97.01 |
| 4,185,308 | 1/1980 | Fujioka | 360/97.02 |

(List continued on next page.)

FOREIGN PATENT DOCUMENTS

| | | |
|---|---|---|
| 0 015 739 | 4/1983 | European Pat. Off. . |
| 26 17 860 | 11/1977 | Germany . |
| 53-55509 | 10/1951 | Japan . |
| 49-34714 | 6/1972 | Japan . |
| 48-87809 | 11/1973 | Japan . |
| 50-152708 | 5/1974 | Japan . |
| 49-85110 | 7/1974 | Japan . |
| 51-62002 | 5/1976 | Japan . |
| 51-151513 | 12/1976 | Japan . |
| 52-145312 | 11/1977 | Japan . |
| 53-51719 | 5/1978 | Japan . |
| 53-57010 | 5/1978 | Japan . |
| 54-41619 | 3/1979 | Japan . |
| 54-58011 | 5/1979 | Japan . |
| 55-170495 | 5/1979 | Japan . |
| 55-43360 | 3/1980 | Japan . |
| 55-141258 | 10/1980 | Japan . |
| 55-25725 | 12/1980 | Japan . |
| 393617 | 6/1933 | United Kingdom . |
| 1328717 | 8/1973 | United Kingdom . |

OTHER PUBLICATIONS

German article entitled "Diskettenantrieb im Mini–Floppy–Laufwerk," taken from *VDI–Berichte NR. 482*, Von Ing. (Grad.) K. Schramm, Nürnberg., pp. 56–59 (1983).

German brochure entitled "P.M. Computerheft—Computer Entdecken Und Verstehen," pp. 49–51 (Feb. 1984).

*Primary Examiner*—John H. Wolff
*Attorney, Agent, or Firm*—Fitch, Even, Tabin & Flannery

[57] ABSTRACT

A disk storage has one or more disks provided with center holes. An electric motor extends coaxially through these holes and has an external rotor to the outer circumference of which the disks are secured so that they rotate with the rotor. A seal is provided for at least reducing the escape of contaminants from the motor.

15 Claims, 4 Drawing Sheets

U.S. PATENT DOCUMENTS

| | | | |
|---|---|---|---|
| 4,190,870 | 2/1980 | Avina et al. | 360/97.03 |
| 4,216,512 | 8/1980 | Vidwans | 360/133 |
| 4,249,221 | 2/1981 | Cox et al. | 360/97.02 |
| 4,275,339 | 6/1981 | Burke et al. | 318/138 |
| 4,280,155 | 7/1981 | Scott et al. | 360/97.03 |
| 4,285,016 | 8/1981 | Gilovich | 360/84 |
| 4,307,425 | 12/1981 | Kaneko et al. | 360/97.03 |
| 4,329,722 | 5/1982 | West | 360/97.03 |
| 4,337,491 | 6/1982 | Hasler et al. | 360/97.02 |
| 4,352,133 | 9/1982 | Hager | 360/106 |
| 4,363,057 | 12/1982 | Siverling et al. | 360/133 X |
| 4,535,373 | 8/1985 | Schuh | 360/97.03 |
| 4,922,406 | 5/1990 | Schuh | 360/97.03 |
| 5,424,887 | 6/1995 | Schuh | 360/97.03 |

DISK STORAGE DRIVE

This is a division of application Ser. No. 08/106,801, filed Aug. 16, 1993, now U.S. Pat. No. 5,424,887 which is a continuation of Ser. No. 07/799,363, filed Nov. 27, 1991, now abandoned; which is a continuation of Ser. No. 07/764,941, filed Sep. 24, 1991, now abandoned; which is a continuation of 07/517,623, filed May 1, 1990, now abandoned; which is a continuation of Ser. No. 07/208,864, filed Jun. 15, 1988, now U.S. Pat. No. 4,922,406; which is a continuation of Ser. No. 07/016,469, filed Feb. 17, 1987, now abandoned; which is a continuation of Ser. No. 06/765,376, filed Aug. 13, 1985, now abandoned; which is a continuation of Ser. No. 06/335,483, filed Dec. 29, 1981, now U.S. Pat. No. 4,535,373; which is a continuation-in-part of Ser. No. 06/127,404, filed Mar. 5, 1980, now abandoned.

The present invention relates to disk storage devices in general, and to a disk storage drive in particular.

In disk storage devices bits representing data are stored in circular tracks on rigid or flexible disks which are rotated at relatively high speeds. Bits are inscribed or read by a read/write head which must be accurately positioned relative to the particular track which is being inscribed or read. This means that the disks must rotate absolutely true, or as close to it as possible.

To impart rotation to such disks it is known to arrange the electric drive motor axially below the disk and to connect the disk via suitable connecting elements to the motor shaft for rotation therewith. This, however, is disadvantageous because the upper of the two motor-shaft bearings is subjected, not the least because of the high-speed rotation, to greater stresses than the lower one. As a result, the disk will soon no longer rotate true and reading and writing errors will develop.

According to another proposal the motor is located somewhat higher, so that the disk is positioned in a plane which is axially adjacent (i.e., as considered with reference to the axis of rotation) to the upper bearing of the motor. The connecting elements are shaped differently than in the first-mentioned construction, but they still connect the disk with the motor axis. This means that although the disadvantages of the first-mentioned construction are somewhat alleviated in this second proposal, they still do exist.

Still another proposal, contained in U.S. Pat. No. 4,101,945 also connects the disk to the motor shaft above the motor, but arranges the bearing system intermediate the disk and the motor.

Common to all this prior art is the connection of the disk to the motor shaft, which requires relatively complicated connecting structure without, however, being able to assure optimum uniformity of load distribution to all bearings of the motor-shaft bearing system.

Accordingly, it is an object of the invention to provide an improved disk storage drive wherein the connection between the disk (or disks) and the drive motor is simpler than in the prior art.

Another object is to provide such a drive in which the forces (load) acting during the operation of the drive are distributed as uniformly as possible to all bearings of the motor-shaft bearing system.

A concomitant object is to provide a drive of the type in question in which the escape of contaminant particles from the interior of the motor, is wholly or substantially precluded. This is important since such particles, for example, lubricant, metal particles and the like, may cause operating difficulties and/or damage to the disks, heads and other sensitive elements located in the "clean-room" environment in which disk storages are generally operated.

Still a further object is to provide such an improved drive which is considerably more compact than those heretofore proposed.

An additional object is to reduce the "out-of-true" running of the disk or disks driven by the inventive drive.

In pursuance of the above objects and of still others which will become apparent hereafter, one aspect of the invention resides in a disk storage drive which, briefly stated, may comprise at least one storage disk having a center hole; an electric motor extending coaxially through the hole and having a stator and a rotor; and means connecting the disk to the rotor for rotation with the same.

By resorting to the invention a direct connection of the disk(s) to the rotating component of the motor is obtained, rather than to the motor shaft and, moreover, the need for connecting elements extending outwardly away from the motor shaft is eliminated. As a result, a very compact and rigid unit of drive motor and disk(s) is obtained. The center of gravity of the disk(s) is located between the two motor bearings, so that the disk oscillating tendency is substantially reduced; the disk(s) can therefore run truer than in the prior art and this eliminates the objectionable prior art disadvantages.

Different types of motors may be used for the inventive drive. A currently preferred type is a brushless or collectorless DC motor of the type disclosed in U.S. Pat. Nos. 3,873,897 and 3,840,761 as well as in German Allowed Application AS 2,225,442. Using a motor of this type and having, for example, a single phase winding, it is possible to obtain a practically constant torque. This is possible in other motors only by using two separate windings which are electrically offset by 90° and through which usually pulses of opposite polarity must be fed. A motor of the type outlined above is thus substantially simpler and less expensive since multiple windings and their associated electronic controls are omitted. Moreover, this type of motor is of excellent operating quality and can be made more compact than other motors of similar ratings, so that the motor can be mounted within the center holes of the disks and the bearing system can be made sufficiently robust to assure a prolonged service life. In connection with this latter aspect it must be remembered that the disk hole diameter is standardized, so that overall smaller dimensions of the motor leave more room for larger bearings to be used.

Even if the disks rotate absolutely true, problems sometimes occur due to dirt particles when writing or reading out data.

A further aspect of the invention, therefore, is based on the finding that the cause of the aforementioned dirt particle problems can be due to dirt particles emanating from the driving arrangements. The dirt may come not only from the bearings, but also from the winding with its highly structured surface. In particular, grease or dust particles can escape from the bearing system. In general, the dirt particles from the bearing system have been held back by complicated and expensive seals, e.g. Ferrofluidic seals, which bring about a sealing action between stationary and rotary parts as a result of a combined action of magnetic fields acting there, together with lubricant emulsions containing magnetically conductive particles.

According to the invention, the dirt particle problem is solved in that labyrinth seals are arranged between the drive parts supplying the dirt particles and the area intended for housing the rigid storage disk. Such labyrinth seals make it possible to completely prevent or at least considerably reduce the risk of dirt particles passing from the inside of the motor into the area of the storage disk, so that no problems occur when writing or reading out data. The term "Seal" as used herein refers to a tight closure, albeit not a perfect closure as totally against the passage of air. The labyrinth seals herein, as will be seen, define intricate paths that inhibit, if not hold in check, the outward movement of contaminant particles from the motor.

Preferably, a labyrinth seal is placed in the vicinity of one axial end of the bearing tube which coaxially receives the bearing, while another labyrinth seal is placed adjacent the other axial end of the bearing tube in the vicinity of the flange. Thus, parts of the driving motor from which dirt particles escape are separated from the substantially dirt particle-free area (so-called clean-room) for housing the rigid storage disks.

The driving motor is preferably constructed as a brushless direct current motor of the external or outer rotor-type with a permanent magnetic rotor, the rotating rotor casing advantageously containing a one-part permanent magnetic ring or a permanent magnetic tape bent in annular manner with approximately trapezoidal radial magnetization via the pole pitch. The permanent magnet can in particular be a magnet combined with a plastic material or a so-called rubber magnet. Such magnets are formed from mixtures of hard ferrites and elastic material, particularly barium ferrite combined with elastomers.

The hub can be part of the rotating rotor casing. In this case, the magnetic shield is appropriately housed within the casing. The permanent magnet of the external rotor is preferably surrounded in bell-shaped manner by the magnetic shield so that no stray magnetic fields can be propagated in the direction of the hub and the rigid storage disks located on the hub. In order to obtain magnetic shielding, which on the one hand requires a relatively small amount of shielding material, but on the other hand provides an inexpensive construction thereof for suppressing stray fields, the magnetic shield appropriately forms part of a magnetic flux return yoke for the permanent magnet and is constructed as a soft magnetic, cup-shaped, deep-drawn member, whose base has a coaxial recess in the core.

A driving mechanism of the aforementioned type generally comprises a speed control circuit and/or driving electronics which, in the case of a brushless direct current motor, more particularly ensures the necessary commutation. If the motor includes a shield ring connected to the stator, it is also possible to use the same for cooling the speed control circuit and/or the drive electronics, particularly if the semiconductor components are kept in thermally conductive contact with the shield ring.

On the end face remote from the hub, the rotor preferably has a fan for forming the ventilation area. Such construction is not only particularly simple, but also leaves the circumferential surface of the rotor free as a braking surface for the brake which is frequently provided with such driving mechanisms.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, wherein:

Figure 1:
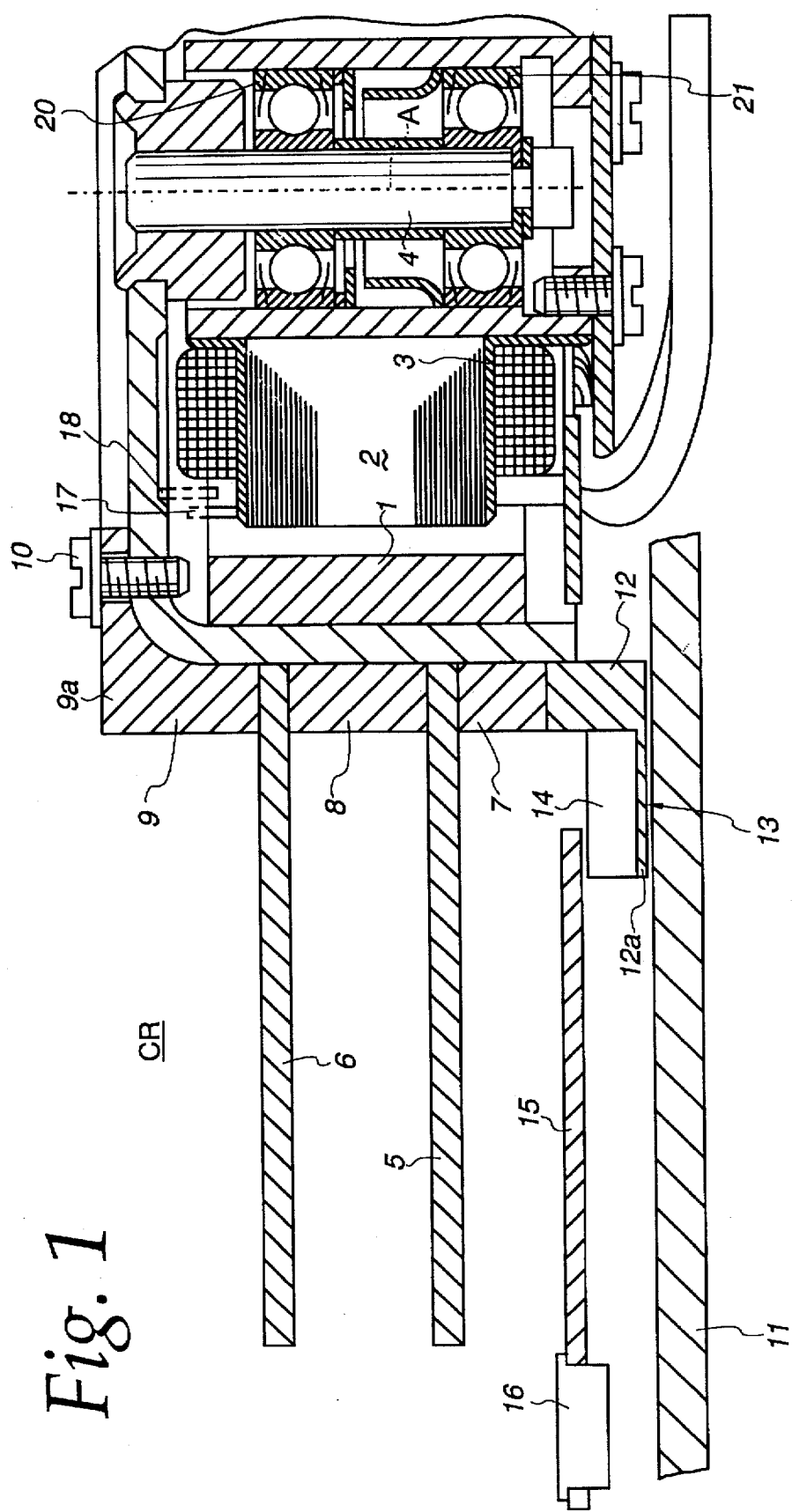
FIG. 1 is a fragmentary view, in vertical section, illustrating a first embodiment of the invention.

In the embodiment of FIG. 1 the drive comprises a brushless or collectorless DC motor according to one of the two previously mentioned U.S. motor patents or the previously mentioned German Allowed Application. This motor has a permanent magnetic rotor 1 which surrounds a stator 2 (i.e., the motor is of the external-rotor type). The stator 2 has a one-strand or phase winding 3 which produces an alternating field and an auxiliary reluctance moment which, in cooperation with the electromagnetic torque, produces a total torque of high constancy. The rotor 1 is journalled in the stator 2 via a shaft 4 and a bearing system composed of two anti-friction bearings 20 and 21 which are spaced from one another axially of the shaft 4. The axis of rotation of the rotor 1 is designated with reference character A.

Mounted directly on the outer periphery of the rotor 1 (i.e., not on the shaft 4) are two disks 5 6 of the disk storage (there could be a single disk or more than two). Mounting is effected via rings 7, 8 and 9 which surround the rotor 1. The disks 5 and 6 are slipped over the rotor 1 (they have the usual center holes) and retained between the rings, 6, 8 and the rings 8, 9, respectively. The ring 7 is secured in suitable manner (e.g., via screws, welds or the like) to the rotor 1. The ring 9 has a flange portion 9a which overlaps the upper side of the rotor 1 and is secured thereto via a plurality of screws 10 (only one shown) which are spaced circumferentially about the axis A. The ring 9 presses against the disk 6 and via the same presses the ring 8 against the disk 5 which in turn is pressed against the ring 7. Thus, the disks 5 and 6 can rotate only with, but not relative to, the rotor 1.

In view of this direct connection of the disks 5, 6 to the rotor, and the position of the disks relative to the bearings in such a manner that the center of gravity of the rotor 1 is located between the two bearings 20, 21, forces are transmitted substantially uniformly to both bearings and the disks 5, 6 rotate true and without, or substantially without, any vibrations or oscillations.

As mentioned before, disk storages are most usually operated in "clean-room" environments to protect them against contaminants. The drive according to the invention is particularly well adapted for such an application, because it can offer an anti-contaminant feature.

Motors, no matter how carefully manufactured, are inevitably a source of contaminant particles since lubricant, abraded metal particles and the like escape from the motor into the ambient atmosphere. In most applications this presents no problem, but it does do so under "clean-room" conditions. Under such circumstances, therefore, the motor and disks may be mounted on a base plate or surface 11 Constituting a part of the wall or walls which bound the "clean-room" environment CR. Such mounting is effected in any manner known per se and requires no illustration. Attached. to the rotor 1 and/or the ring 7 (or else of one piece with either of these) is another ring 12 of generally L-shaped cross-section, having a portion 12a which extends parallel to the plate 11 and defines therewith a narrow gap 13 which communicates with the environment CR and with the air gap of the motor. The upper surface of the portion 12a carries an annulus (one blade shown) of radially extending blades 14 which are arranged circumferentially of the ring 12. An intermediate annular plate 15 is mounted above the plate 11, between the same and the lower disk 5. Its radially inner edge portion overlaps but is upwardly spaced from the blades 14. The plate 15 is provided with one or more openings (one shown) in which a filter 16 is installed. The airflow produced by the ring 12 and its blades 14 (acting as an impeller) causes a constant circulation of air through the filter or filters 16, so that any contaminants released by the motor become entrapped in the filter 16 and can do no harm in the environment CR.

Two overlapping annular baffles 17, 18 on the stator 2 and the rotor 1 are interposed in the airgap between stator and rotor, defining with one another their own airgap which serves to further retard the escape of contaminants from the motor to the environment.

Figure 2:
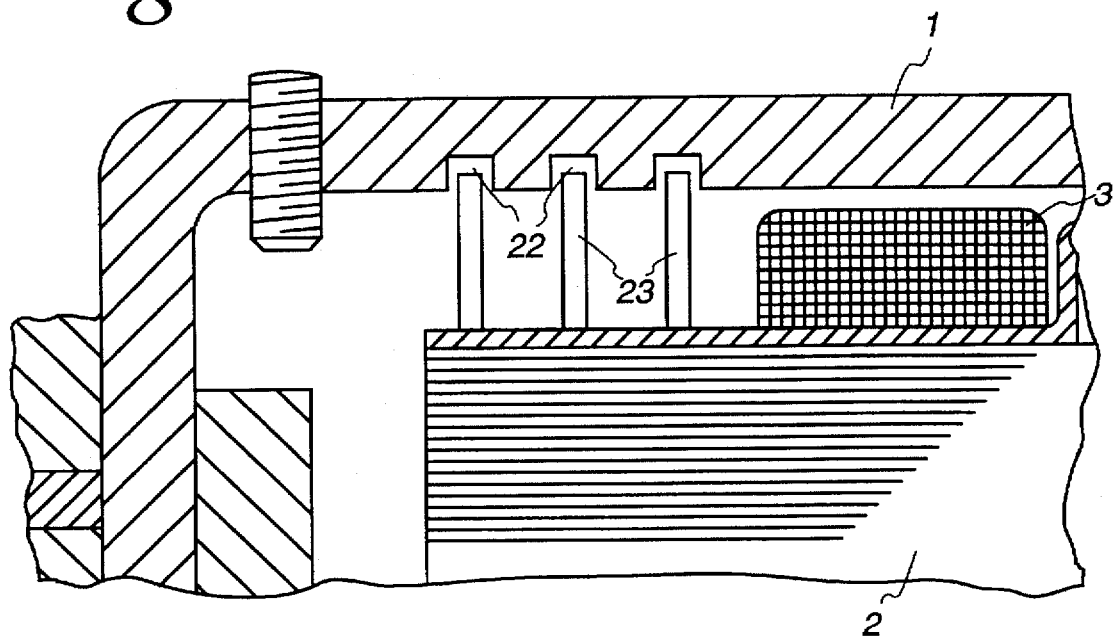
FIG. 2 is an enlarged fragmentary detail view, showing a modification of the embodiment in FIG. 1.

The embodiment of FIG. 2 is the-same as the embodiment of FIG. 1, with the exceptions to be described, and therefore an illustration and discussion of the already familiar elements is not needed.

FIG. 2 differs from FIG. 1 in the more elaborate seal which replaces the baffles 17, 18. This seal, arranged in the same location as the baffles in FIG. 1, is a labyrinth seal formed by a plurality of annular grooves 22 in the inner surface of the rotor 1 into which a plurality of ribs 23 project from the stator 2. There is no contact of the ribs with the material bounding the grooves and the arrangement serves as a highly effective seal against the escape of contaminants to the motor. Incidentally, it goes without saying that although the seal is shown radially outwardly of the winding 3, it could be located radially inwardly of the same or it could be located both radially inwardly and radially outwardly to improve the effect still further.

Figure 3:
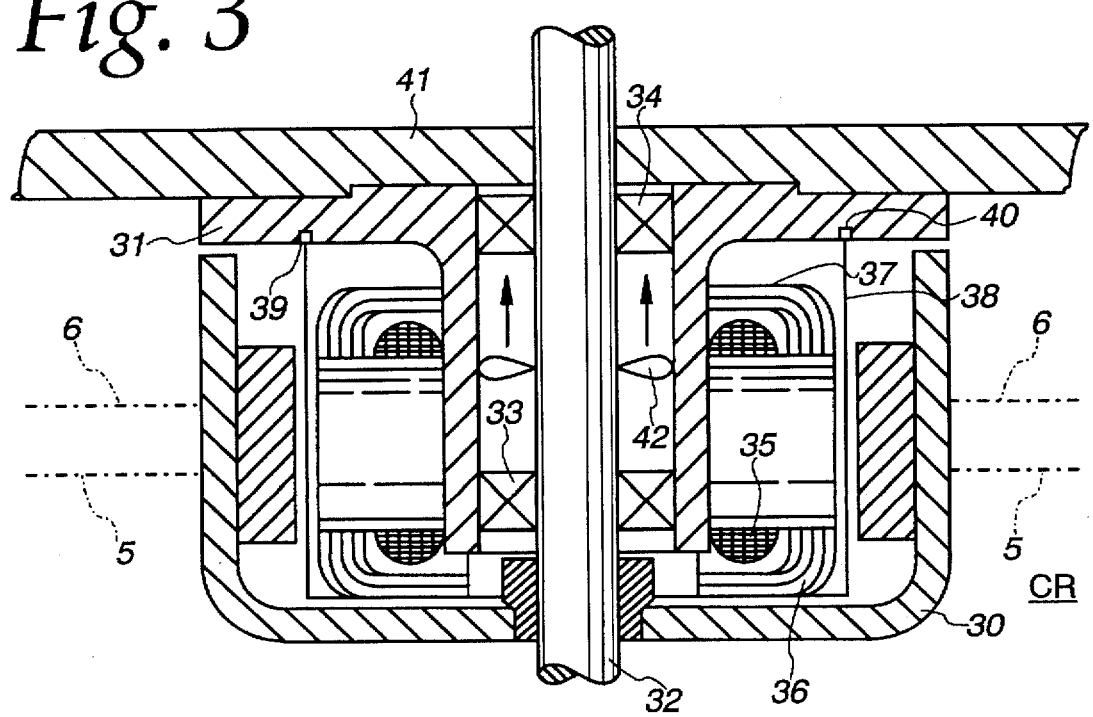
FIG. 3 is a view analogous to FIG. 1 but illustrating still another embodiment of the invention.

The embodiment of FIG. 3 is also particularly suited for "clean-room" applications. Here, the rotor 30 is mounted in the stator 31 via a shaft 32 and anti-friction bearings 33, 34. The winding 35 of the stator 31 is heavily potted, i.e., embedded in one of the electrically insulating materials 36 which are known per se in the art, to prevent the escape of contaminant particles. The potting material 36 may in turn be surrounded by a jacket of heat-shrinkable synthetic plastic (also known per se) which, when shrunk onto the material 36, surrounds the same extremely tightly and further prevents the escape of contaminant particles. A cupped inverted cover 38 of electrically insulating material may surround the winding, being connected to the stator 31, and have an upper free circumferential edge 39 which extends into an annular groove 40 of the stator 31 to provide still another seal against the escape of contaminants. The groove 40 could be omitted and the edge 39 simply abut the stator 31.

The disks 5 and 6 are shown only diagrammatically here. Their mounting on rotor 30, although not shown, may be analogous to the showing in FIG. 1. The stator 31 is mounted beneath a supporting plate 41 and the "cleanroom" environment CR is also below this plate.

Within the hub of the stator 31, intermediate the bearings 33, 34, the shaft 32 carries a set of blades 42 which, on rotation of the shaft 32, cause an axial airflow in the direction indicated by the arrows. Thus, air is drawn from the environment CR through the bearing 33 and expelled via the bearing 34 and the opening in the plate 41, into the non-controlled ambient atmosphere. Any contaminant particles which may be liberated in the path of this airflow, for example, dust abraded bearing metal particles, will be expelled from the motor to the ambient atmosphere and cannot enter the environment CR.

Figure 4:
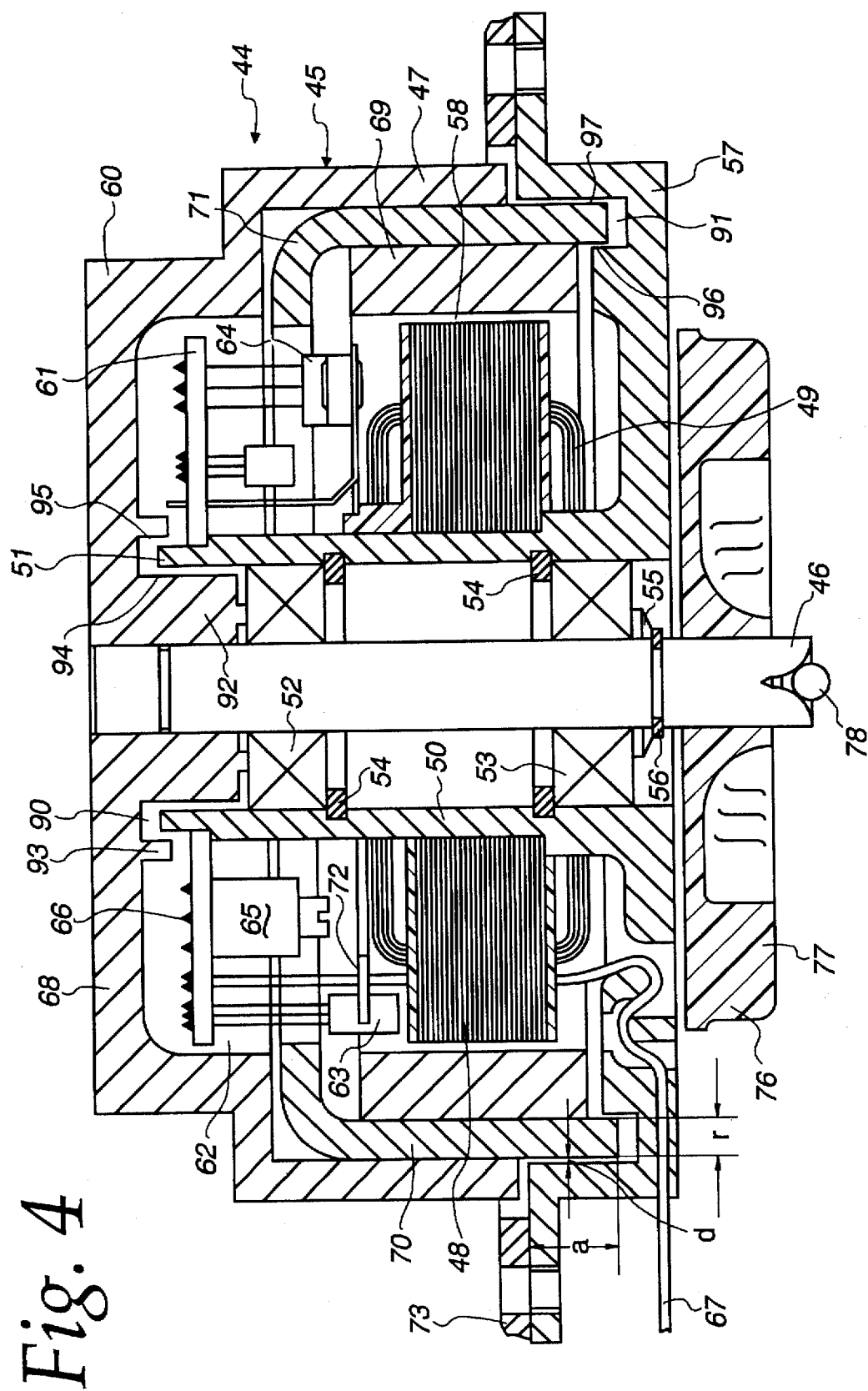
FIG. 4 is a sectional view through still another embodiment constructed in accordance with the invention.

Referring now to the embodiment in FIG. 4, a driving mechanism 44 is illustrated and has a brushless direct current motor 45 with a rotor casing 47 fixed to a rotor shaft 46 and concentric thereto. A group of stator plates 48 carrying a stator winding 49 forms part of the stator of the motor 45. The stator plates 48 surround a bearing tube 50, which is part of central support 51. The rotor shaft 46 is mounted in the bearing tube 50 with the aid of two bearings 52, 53, which are held in place by spaced retaining rings 54. A cup spring 55 bears against the bottom of bearing 53 and a retaining ring 56 located on rotor shaft 46 so that bearings 52, 53 are axially braced relative to one another. Together with an assembly flange 57, the bearing tube 50 forms a one-piece die casting. As an alternative, the bearing tube 50 can be force fitted into a hub joined to the flange 57.

Rotor casing 47 not only surrounds the group of stator plates 48 and forms a cylindrical air gap 58, but on the side remote from the assembly flange 57 is axially extended, providing a hub 60. The hub 60 is used for mounting and driving one or more rigid storage disks not shown) having a central bore, whose diameter corresponds to the external diameter of the hub 60. These disks can be commercially available 5¼" or 8" disks. The illustrated construction makes it possible to adapt the diameter of the hub 60 to the central bore of the storage disks without taking account of the necessary drive power of the motor 45 and the resulting most favorable diameter of the air gap 58. A printed circuit board 61 is housed in free space 62 within the hub 60. The circuit board 61 is circular and is connected to the central support 51. The circuit board 61 carries the drive electronics and a speed control circuit, which includes, among other things, a Hall IC 63 serving as a rotation position detector, output stage transistors 64 and a potentiometer 65. The soldered joints of the circuit components of the drive electronics and the speed control circuit, which are preferably produced in one operation, for example, in a dip soldering process, are indicated at 66. The potentiometer 65 can be used, for example, for setting different operating points or for compensating component tolerances. It can be adjusted by means of a screwdriver via a bore (not shown) in the flange 57 and one of the slots in the stator plates 48. A line 67 leading to the printed circuit board 61 is connected to a DC voltage source. The side of the circuit board 61 tarrying the soldered joints 65 faces the base 68 of the rotor casing 47.

In this embodiment, the rotor casing 47 is made from a magnetically non-conducting or poorly conducting material, for example, an aluminum alloy die casting. A plurality of continuous segments or a one-part permanent magnet 69 is fixed to the inner surface of the rotor casing 47 facing the stator plates 48. The permanent magnet preferably comprises a mixture including a hard ferrite, for example, barium ferrite, and elastic material and thus forms a so-called rubber magnet. It is trapezoidally or approximately trapezoidally radially magnetized via the pole pitch with a relatively small pole clearance. A magnetic flux return yoke 70 is positioned between the rotor casing 47 and the permanent magnet 69. The magnetic flux return yoke 70 also forms part of the magnetic shield.

It is in principle also possible to produce the rotor casing 47 from magnetically conductive material, particularly soft iron, because of its being constructed in the form, for example, of a deep drawn part. In such instance, there is no need for a separate soft iron yoke.

The magnetic flux return yoke 70, including a rounded portion 71 and a shield ring 72, surround the magnetically active part of the driving mechanism 44 in a bell-shaped manner. This effectively prevents the propagation of stray magnetic fields in the area of the rigid storage disks located on the hub 60. Stray flux cannot pass to any significant extent through the annular clearance between the rounded portion 71, the shield ring 72 and the recesses of the shield ring 72 for the passage of the one or more Hall IC 63, because the soft magnetic shield rings draw the flux towards them. In the illustrated embodiment, the fixed shield ring 72 is simultaneously used as a heat sink for the output stage transistor 64 thermally conductively connected to the shield ring 72 by full surface engagement. If necessary, the cooling bodies of the output stage transistor 64 can be electrically insulated from the shield ring 72, for example, by means of a mica washer or the like. It is also possible to subdivide the shield ring 72 as the function of the number of output stage transistors 64 in order to avoid such an electrical insulation., The assembly flange 57 makes it possible to fit the driving mechanism 44 in a way not shown in FIG. 1 to a partition 73 of the apparatus. Such partition 73 separates the ultra-clean area for receiving the rigid storage disks from the remainder of the interior of the apparatus. Any dirt particles, grease vapors or the like, which may escape from the bearing 52 are held back by labyrinth seals 90, 91. The labyrinth seals are formed by stationary and rotary parts, which coaxially interengage within the driving mechanism. Although no material forming an actual packing or gasket is used to form the seal, and the labyrinth 90 is in fact a narrow gap forming a tight passage, the overall affect on contaminant particles is that of a seal because of the structural contaminant of the particles being restricted by the maze.

With respect to the bearing 52, the base 68 is constructed as a cylindrical bushing 92 and extends into the bearing tube 50. There is only a small gap 94, with a maximum axial extension for the escape of dirt particles from the bearing 52, the action of labyrinth seal 90 being reinforced by the gap 95 formed by a ring 93 and the bearing tube 50.

In the same way, the magnetic flux return yoke 70 forms a further labyrinth seal 91. Because the flux return yoke 70 engages in an all-round recess of the flange 57, the combination with the small, but axailly extending gaps 96, 97 prevents the escape of dirt particles from the inside of the motor.

To increase the action of the labyrinth seals when holding back the dirt particles, the axially directed gaps 94, 95, 96, 97 are in each case kept as narrow as possible, i.e. they are radially small being approximately 1 to 2 mm (see dimension d), but they have a maximum axial length of, for example, 5 to 20 mm (see dimension a). The gap size or thickness in the radial direction cannot be randomly small, however, because this means high manufacturing costs and in particular high windage losses. Depending on the characteristics of the adjacent surfaces, windage losses can be considerable. Such direct storage drives are in fact operated at, for example, 5000 rpm. However, the radially driven gaps are axially, for example, 3 or 5 mm "thick" and radially preferably below 100 mm "long". (These values relate to a motor size whose diameter is half that shown in FIG. 4). Further gaps are also possible.

Thus, labyrinth members can additionally or alternatively pass, for example, from a coil stator cover in a comb-like manner into grooves of opposing matching shape formed in the bottom of a bell-shaped outer rotor casing. In principle, the aforementioned dimensioning of the gaps applies here.

Figure 5:
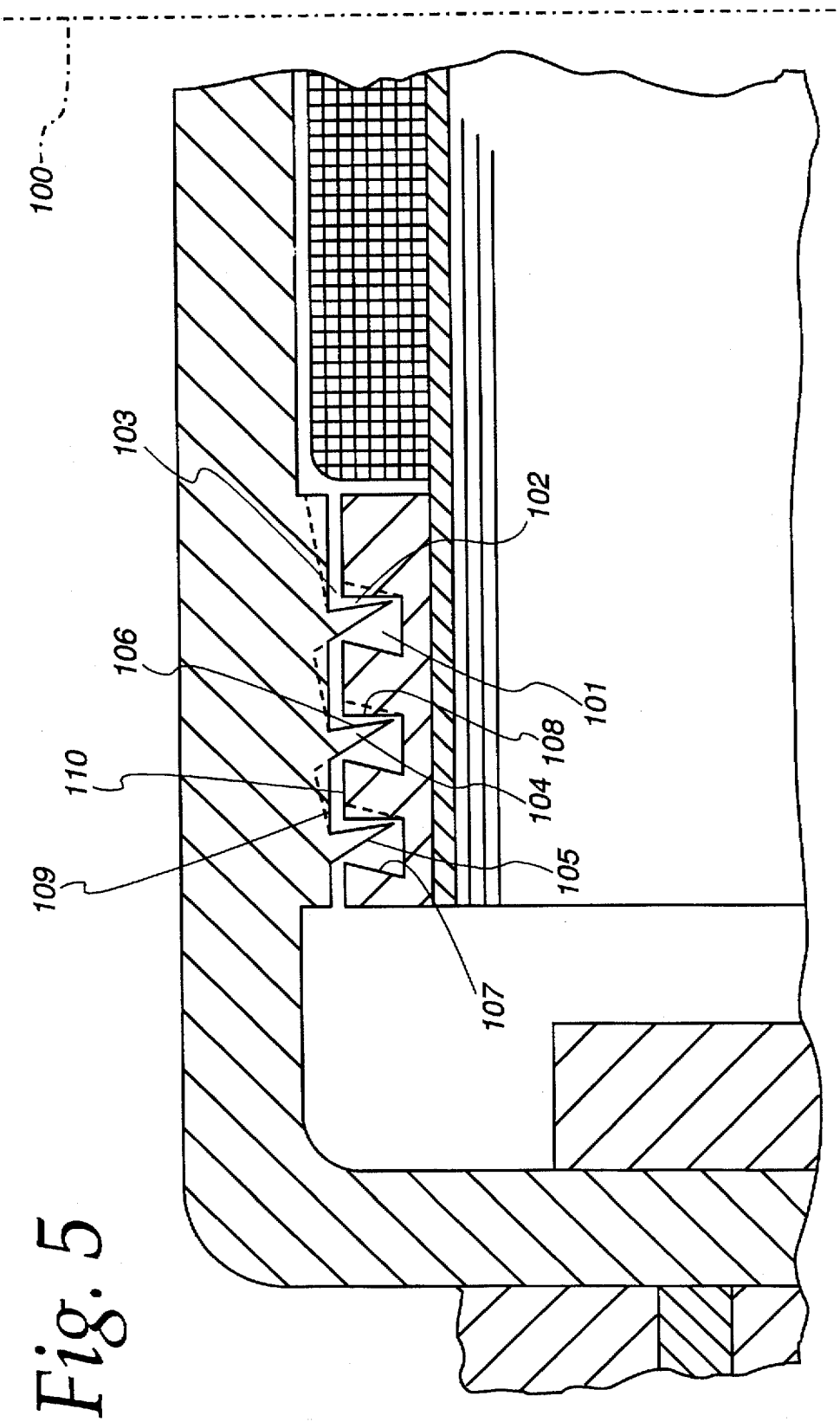
FIG. 5 is an enlarged fragmentary detail view showing another modification of the embodiment in FIG. 1.

Whether the grooves are in the stationary or the rotary member, it is the purpose of such structure, of course, to establish a dynamic sealing system. In this connection, reference is now made to FIG. 5 showing a variation of the comb-like structure shown in FIG. 2. In such structure as therein illustrated, a dynamic sealing system is achieved by labyrinth or comb-like structural features that create traps for the contaminant particles or gases. The traps will either maintain the contaminants within the inner cavities of the driving mechanism or guide back into such inner cavities.

For a description of the structure illustrated in FIG. 5, reference is made to the motor axis of rotation 100 as a basis for direction. Thus, "inside" refers to a direction toward the axis of rotation and "outside" refers to a direction away from the axis of rotation. The comb-like structure includes a plurality of annular cavities 101 provided in the stationary member or stator concentric with the axis of rotation. The three cavities shown are for purposes of illustration and description, there being no intention to restrict the invention to a specific number of cavities. One such cavity can be effective. These cavaties act as traps for pollutant particles and are shaped in cross-section to create, by means of slanted walls, no forced air flow toward the outside. In this connection, reference is made to outer walls 107 which are slanted inwardly as they extend upwardly toward the groove opening from the groove base and inner walls 108 which are either vertical as shown in solid lines or slanted slightly inwardly as shown in dotted lines as they rise upwards. Thus, the surface 107 is slanted to guide any created air flow back into the cavity or at least maintain air (gases and pollutant particles) within the cavity. The surface 108 of the cavity is either cylindrical (vertical wall) or slanted (cone-shaped) inwardly toward the axis of rotation. An annular surface 110 of the stationary member connects the upper edges of surfaces 107 and 108.

Extending into these cavities from the rotating member are ring shape protrusions.104, one for each of the cavities. These rotating protrusions are somewhat conical in form in that the cross-section of their body slants generally inwardly toward the motor axis such that the free circumferential edge lies nearer the axis than any other part of the body. These protrusions, of course, avoid a general radial movement of air flow between the rotating and stationary parts. Each protrusion 104 has an outer (larger diameter) surface 105 and an inner (smaller diameter) surface 106. The outer surface 105 tapers inwardly toward the axis more than does the inner surface 106. The inner surface 106 does cause any tendency toward the air flow radially outwardly to travel upwards by centrifugal force and, therefore, back toward the inside. Annular surfaces 109 connect the base of the protrusions 104 on the rotating member. Between the protrusions 104 and the cavities 101, respectively, are narrow gaps 102 which can be narrowed down to almost capillary size to avoid build up of a dynamic air flow system. Extending radially between the annular surfaces 109 and 110 are gaps 103. These, also, can be made narrow to achieve additional sealing effect. As an alternative, these gaps can be made wedge-shaped with the narrow portion of the gap at the larger diameter respectively of each gap as indicated in dotted lines.

A fan 76 with fan blades 77 is fixed to the free end of the rotor shaft 46 remote from the hub 60. The fan 76 leads to an intense air movement in the vicinity of the assembly flange 57, so that the flange is cooled. By means of the bearing tube 50 and the flange 57, dissipated heat from the motor 45 is effectively conducted to the outside in this way.

To prevent an electrical charging of the rotor bell which would be detrimental to the operating reliability of the memory storage, the rotor shaft 46 is appropriately connected in an electrically conductive manner to the apparatus chassis via a bearing ball 78 and a spring contact (not shown).

Of course, the described embodiment can be modified if necessary within the principles of this invention.

The brushless DC motor 45 can advantageously be a single-phase electronic motor with an auxiliary reluctance moment (single or two-pulse) (U.S. Pat. No. 3,873,897) or a three-phase electronic motor as described in earlier dated German application P30 21 328.6.

The idling speed of motor 45 can be 5,800 rpm and the rated speed, for example, 3,600 rpm.

The stator advantageously has four distinct wound poles, whose pole tips are so deformed that the width of the air gap 58 is modified in the vicinity of the tips and consequently the auxiliary reluctance moment is produced.

The invention is susceptible of a variety of modifications. For example, if desired, a shielding element could be used to surround the rotor, being connected thereto for rotation with the same. The disks could then be mounted on this shielding element. The element connecting the upper end of the shaft 4 to the rotor 1 (see FIG. 1) could be constructed as a radial-flow impeller in lieu of, or in addition to, and to perform the function of, the impeller 12, 14. The drive according to the invention is suitable for use with all types of disk storages and irrespective of the diameter of the center hole of the disks. It is also conceivable to use an AC motor instead of a DC motor and to use an internal-rotor motor. Only slight modifications would be necessary in the latter case to mount the disks in the desired manner.

While the invention has been illustrated and described as embodied in a disk storage drive, it is not intended to be limited to the details shown, since various modifications and structural changes may be made without departing in any way from the spirit of the present invention. For example, the ring 7 of FIG. 1 could be of one piece with the rotor 1.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A disk storage device, comprising in combination;

a clean room enclosed within at least one containment wall;

at least one storage disk positioned in said clean room;

at least one read/write head mounted in said clean room for movement in operative relation to said at least one disk;

a brushless direct current motor for moving said at least one disk in operative relation to said at least one read/write head to allow information to be stored on and retrieved from said at least one disk, said motor including a bearing tube with an integral radially extending base flange connected to said containment wall, a bearing system contained within said bearing tube, an annular stator with an axial dimension surrounding the bearing tube, a rotor shaft journalled in said rotor bearing system in said tube, and an outer rotor including a rotor casing, said rotor having a permanent magnet on the inner surface thereof, said rotor surrounding the stator with the permanent magnet opposing the stator to provide a magnetic field therearound and spaced therefrom and defining a cylindrical air-gap between the magnet and the stator with at least a portion of the rotor extending axially beyond the axial extent of the stator, the motor being mounted with the rotor located in the contaminant-free environment;

a detachable coupling for connecting said at least one disk to said rotor for rotation therewith; and a labyrinth seal defined between a stationary element and an element rotatable with said rotor, said labyrinth seal being located between the rotor bearing system and the contaminant-free environment to prevent contaminant particles from leaving the rotor bearing system and entering the contaminant-free environment.

2. A disk storage device as claimed in claim 1, wherein said element of the labyrinth seal rotatable with the rotor includes a groove into which the stationary element of the labyrinth seal extends.

3. A disk storage device as claimed in claim 1, wherein the labyrinth seal is formed by a plurality of stationary elements which interleave with a plurality of rotatable comb-like projections constituting rotational elements.

4. A disk storage device as claimed in claim 3, wherein the comb-like projections have spacings therebetween unequal to each other.

5. A disk storage device as claimed in claim 1, wherein the stationary element is part of the stator.

6. A disk storage device as claimed in claim 1, wherein the labyrinth seal is located at one end of the bearing tube.

7. A disk storage device as claimed in claim 1, wherein said outer rotor is of cup-shaped design and has a closed end.

8. A disk storage device as claimed in claim 7, wherein said closed end is secured to the rotor shaft for rotation therewith.

9. A disk storage device according to claim 7, wherein said labyrinth seal is located in a movement path of contaminant particles between the rotor bearing system and said air-gap.

10. A disk storage device as claimed in claim 9, further comprising a second labyrinth seal defined between a stationary element and an element rotatable with the rotor, said second labyrinth seal being located at the open end of the rotor to prevent contaminant particles passing from the air-gap to outside the rotor, with an open outer edge of the rotor constituting the rotatable element of said second labyrinth seal.

11. A disk storage device as claimed in claim 10, wherein either labyrinth seal is "U"-shaped, formed of a substantially radially extending gap joining two substantially axially extending gaps.

12. A disk storage device as claimed in claim 11, wherein a length (a) of one axially extending gap as measured in the axial direction is longer than a length (r) of the radially extending gap as measured in the radial direction.

13. A disk storage device as claimed in claim 12, wherein a width (d) of the axially extending gap as measured in the radial direction is smaller than (r).

14. A disk storage device as claimed in claim 13, wherein a:d is greater than 10:1.

15. A disk storage device as claimed in claim 1, further comprising an airflow filter positioned within said clean room, said clean room being formed to direct an airflow filter positioned within said clean room, said clean room being formed to direct an airflow through said filter to entrap any contaminants released from said motor into said clean room, said airflow being caused by the rotation of said rotor within said clean room during operation of said device.

* * * * *

UNITED STATES PATENT AND TRADEMARK OFFICE
CERTIFICATE OF CORRECTION

PATENT NO. : 5,729,403
DATED : March 17, 1998
INVENTOR(S) : Bernard Schuh

It is certified that error appears in the above-identified patent and that said Letters Patent is hereby corrected as shown below:

IN THE CLAIMS:

Claim 15, column 10, lines 58-59, delete "filter positioned within said clean room, said clean room being formed to direct an airflow".

Signed and Sealed this

Eleventh Day of April, 2000

Attest:

Attesting Officer

Q. TODD DICKINSON

Director of Patents and Trademarks